United States Patent [19]

Hellriegel et al.

[11] Patent Number: 5,648,867
[45] Date of Patent: Jul. 15, 1997

[54] LENS SYSTEM AND PHOTOGRAPHIC COPIER FOR ROTATING IMAGES

[75] Inventors: Walter Hellriegel; Eberhard Dietzsch, both of Jena, Germany

[73] Assignee: Agfa-Gevaert AG, Leverkusen, Germany

[21] Appl. No.: 524,292

[22] Filed: Sep. 5, 1995

[30] Foreign Application Priority Data

Sep. 21, 1994 [DE] Germany .......... 44 33 713.2
Feb. 21, 1995 [DE] Germany .......... 195 05 944.1

[51] Int. Cl.$^6$ .......... G02B 5/20; G02B 17/00; G02B 23/00; G03B 27/74
[52] U.S. Cl. .......... 359/362; 359/365; 359/377; 359/422; 359/432; 359/508; 359/514; 359/556; 359/557; 355/68
[58] Field of Search .......... 359/362, 365, 359/508, 514, 676, 678, 695, 556, 557, 377, 422, 432, 431; 355/68

[56] References Cited

U.S. PATENT DOCUMENTS

| | | | |
|---|---|---|---|
| 3,781,464 | 12/1973 | Bousky | 178/5.4 ES |
| 3,909,106 | 9/1975 | Buhler | 359/377 |
| 4,175,826 | 11/1979 | Blaha et al. | 359/377 |
| 4,249,793 | 2/1981 | Uehara | 359/422 |
| 4,523,839 | 6/1985 | Payrammer et al. | 355/68 |
| 4,647,187 | 3/1987 | Zahn et al. | 355/21 |
| 4,832,470 | 5/1989 | Wakamiya | 359/673 |
| 4,842,395 | 6/1989 | Sato et al. | 359/432 |
| 5,182,671 | 1/1993 | Kitagishi et al. | 359/557 |
| 5,315,434 | 5/1994 | Horiuchi | 359/554 |

FOREIGN PATENT DOCUMENTS

| | | |
|---|---|---|
| 157 325 | 9/1988 | European Pat. Off. . |
| 1386114 | 1/1965 | France .......... 359/556 |
| 24 36 230 | 2/1975 | Germany . |
| 42 24 740 A1 | 2/1994 | Germany . |

*Primary Examiner*—Paul M. Dzierzynski
*Assistant Examiner*—Mohammad Y. Sikder
*Attorney, Agent, or Firm*—Darby & Darby

[57] ABSTRACT

An objective has a first group of lenses with a first optical axis and a second group of lenses with a second optical axis. The optical axes are offset from and parallel to one another. A pair of Porroprisms is disposed between the first lens group and the second lens group and serves to rotate images. The Porroprisms cause a shift in optical axis, and the first and second optical axes are spaced from each other by a distance corresponding to this shift. The arrangement is such that light travelling along the optical axis of one lens group can enter the Porroprisms for reflection to the optical axis of the other lens group. The first lens group has negative refractive power while the second lens group has positive refractive power. A rhomboidal prism is located on the side of the second lens group remote from the Porroprisms and functions to cause a shift in optical axis equal but opposite to the shift caused by the Porroprisms.

37 Claims, 3 Drawing Sheets

LENS SYSTEM AND PHOTOGRAPHIC COPIER FOR ROTATING IMAGES

BACKGROUND OF THE INVENTION

The invention relates to a lens system.

The German publication 24 36 230 discloses a lens system or objective containing a prism which rotates images. To minimize the size of the objective, the prism is integrated between two groups of lenses. Each group constitutes a converging lens group, and the prism lies on the optical axis. The structure of the German publication requires a real intermediate image, and hence an additional optical arrangement to produce the intermediate image. Accordingly, the cost and length of the objective are relatively great.

Another optical system for effecting image rotation is known from the European patent application 0 157 325. Here, the image is produced by a normal objective. A Porroprism arrangement is used for image rotation, and such arrangement is located outside of the objective, and thus also outside of the focal point. This requires the prisms to be greatly oversized relative to the focal point, particularly for larger projection angles and for the avoidance of vignetting, thereby causing the optical system to be large.

SUMMARY OF THE INVENTION

It is an object of the invention to provide a prism-containing lens system which may be relatively compact.

Another object of the invention is to provide a prism-containing lens system which can have a relatively large image field.

An additional object of the invention is to provide a prism-containing copier which may be relatively compact.

A further object of the invention is to provide a prism-containing copier which can have a relatively large image field.

It is also an object of the invention to provide a method which enables an image to be generated via a prism in a relatively small space.

The preceding objects, as well as others which will become apparent as the description proceeds, are achieved by the invention.

One aspect of the invention resides in a lens system, e.g., an objective. The system comprises first lens means, second lens means, and prism means between the first lens means and the second lens means. The first lens means has negative refractive power and the second lens means has positive refractive power.

The invention is based on the recognition that a lens system having prism means integrated between first and second lens means can have a relatively small size and a relatively large image field when imaging takes place in one step and the two lens means respectively have negative and positive refractive powers.

The first and second lens means may constitute, or constitute part of, conjugates of different length with the first lens means being longer than the second lens means. By making the lens means with negative refractive power longer than the lens means with positive refractive power, the angle of the main beam may be reduced within the prism means. This makes it possible to achieve a large image angle on the side of the lens means with negative refractive power. The shorter lens means with positive refractive power, which is a converging lens means, serves to produce a real image.

A lens means with negative refractive power has the drawback that the divergence of an axial beam is increased. This can lead to increases in prism size. To prevent excessive divergence while achieving an adequate reduction in the angle of the main beam within the prism means, the longer lens means with negative refractive power may be constructed as an inverted Galilean telescope. A lens means designed in this manner not only acts to reduce the angle of the main beam but additionally has a dispersion effect.

Due to the negative refractive power of the longer conjugate and the positive refractive power of the shorter conjugate, the main beam angle on the side of the shorter conjugate is small. Moreover, this design results in a very large lens-to-image distance, of the order of the focal length or greater, on the side of the shorter conjugate. This is very advantageous structurally, especially in enlarging copiers.

The prism means may be provided with two surface portions through which light enters and leaves the prism means. The first and second lens means can have relatively small diameters and convex external surfaces, and it is then possible to place the first and second lens means close to respective ones of the above surface portions of the prism means. This construction contributes to compactness.

Another aspect of the invention resides in a copier, particularly a photographic copier. The copier comprises a first positioning arrangement for positioning masters at a first location, a second positioning arrangement for positioning copy material at a second location, and a lens system for projecting images of the masters to the second location. The lens system includes first lens means, second lens means, and prism means between the first lens means and the second lens means. The first lens means has negative refractive power and the second lens means has positive refractive power.

Additional features and advantages of the invention will be forthcoming from the following detailed description of preferred embodiments when read in conjunction with the accompanying drawings.

DESCRIPTION OF THE PREFERRED EMBODIMENTS

Figure 1:
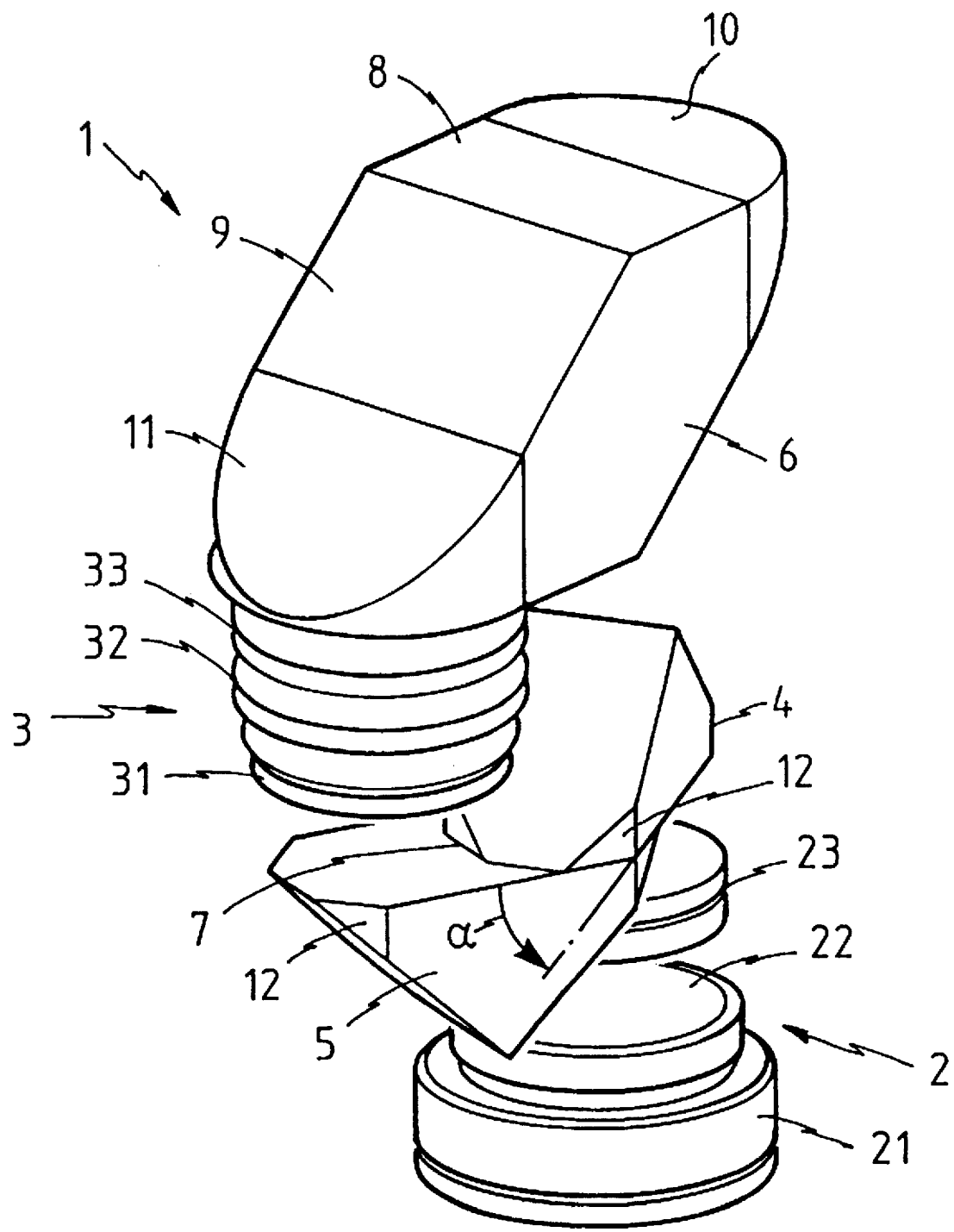
FIG. 1 is a perspective view of a lens system according to the invention.
Figure 2:
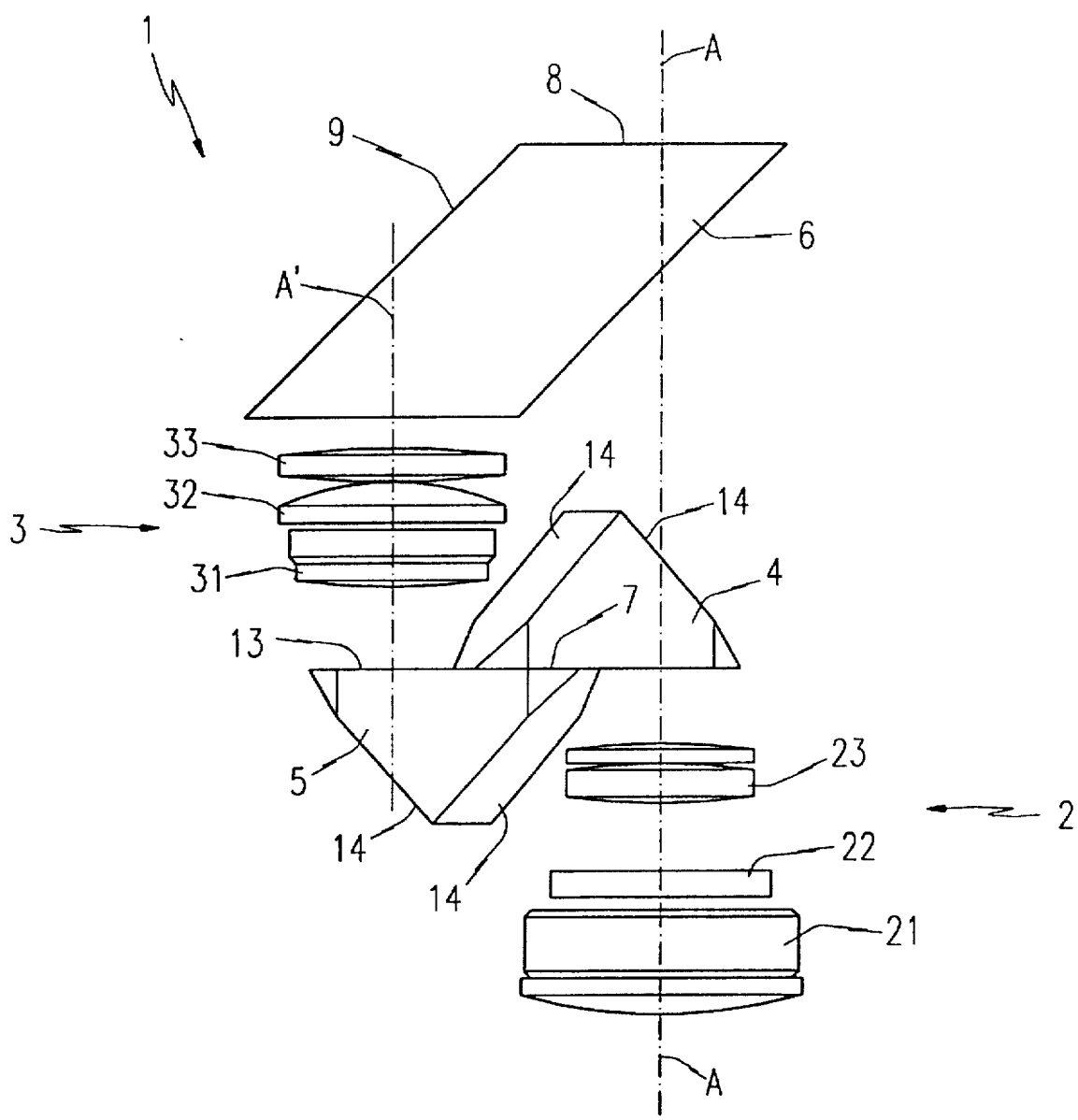
FIG. 2 is a side view of the lens system.

Referring to FIGS. 1 and 2, the numeral 1 generally identifies a lens system in accordance with the invention. The lens system 1, which here constitutes an objective, includes a first group of lenses or first lens means 2 and a second group of lenses or second lens means 3. The lens group 2 has an optical axis A while the lens group 3 has an optical axis A' which is parallel to but offset from the optical axis A.

A Porroprism unit including two Porroprisms 4 and 5 is disposed between the lens groups 2 and 3. The Porroprisms 4,5 are rotationally offset from one another by an angle alpha of 22.5 degrees so that an image is rotated through 90 degrees within the objective 1. The lens groups 2,3 and Porroprisms 4,5 together define an optical path. For instance, light travelling along the optical axis A towards the lens group 2 is directed through the latter to the Porroprism 4 which reflects the light to the Porroprism 5. The Porroprism 5, in turn, reflects the light onto the optical axis A' and through the lens group 3.

Downstream of or behind the lens group 3, as considered in the direction of travel of light from the lens group 2 to the lens group 3, is a rhomboidal prism 6. The rhomboidal prism 6 has a pair of reflecting surfaces or surface portions 9 and 11 which reflect light through an angle of 90 degrees, and the rhomboidal prism 6 is rounded in the area of the reflecting surface 11. The reflecting surface 11 lies in the same plane as another reflecting surface which is not visible in FIGS. 1 and 2 and is located at the downstream side of the rhomboidal prism 6 as considered in the direction from the lens group 2 to the rhomboidal prism 6. The downstream side of the rhomboidal prism 6 constitutes an exit side thereof in such direction.

In the rhomboidal prism 6, light travelling from the lens group 2 to the rhomboidal prism 6 is reflected back to the optical axis A' via the reflecting surfaces 9,11. Following reflection to the optical axis A', the light leaves the rhomboidal prism 6 through two additional surfaces or surface portions 8 and 10 of the rhomboidal prism 6. The surfaces 8,10 constitute exit surfaces of the rhomboidal prism 6 for light travelling from the lens group 2 to the rhomboidal prism 6. The rhomboidal prism 6 is again rounded in the region of the surfaces 8,10 in order to reduce size.

The rhomboidal prism 6 is arranged so that the optical axis A of the lens group 2 intersects one of the surfaces 8,10 of the rhomboidal prism 6. Furthermore, a section of the rhomboidal prism 6 between the surfaces 11 and 10 confronts or overlaps the Porroprism 4.

The lens groups 2, 3 have a common stop 7 which is located midway between the lens groups 2, 3 and lies directly between the Porroprisms 4, 5. Each of the Porroprisms 4, 5 has a base surface 13, and portions of the respective base surfaces 13 overlap one another. The overlapping surface portions can be kept relatively small by positioning the stop 7 as above. Accordingly, the Porroprisms 4, 5 can have relatively small sizes. The numeral 12 indicates that the edges of the Porroprisms 4, 5 can be bevelled in the areas of the overlapping surface portions. The stop 7 can also be relatively small.

The lens groups 2,3 constitute, or constitute part of, conjugates of different length or thickness, and the length or thickness of the lens group 2 exceeds the length or thickness of the lens group 3. If the direction of travel of light is reversed from that outlined previously so that light enters the objective 1 through the rhomboidal prism 6 and leaves via the lens group 2, the objective 1 functions as an enlarger or magnifier.

The lens group 2 includes a first lens unit 21 made up of two individual lenses. The lens unit 21 has negative refractive power. The lens group 2 further includes a second lens unit 22 which is constituted by a single lens and likewise has negative refractive power. The lens group 2 additionally includes a third lens unit 23 which is again made up of two individual lenses and has positive refractive power. The overall refractive power of the lens group 2 is negative. The lens group 2 is constructed like an inverted Galilean telescope.

The lens group 3 comprises a first lens unit 31 which is made up of two individual lenses and has negative refractive power. The lens group 3 also comprises a second lens unit 32 which consists of a single lens and has positive refractive power, and a third lens unit 33 which likewise consists of a single lens and likewise has positive refractive power. The overall refractive power of the lens group 3 is positive, and the lens group 3 constitutes a converging lens group.

As mentioned earlier, each of the Porroprisms 4, 5 has a base surface 13, and portions of the respective base surfaces 13 overlap one another. The overlapping surfaces portions can be adhesively connected to each other or can be separated by a small air gap which accommodates the stop 7 or a portion thereof. Each of the Porroprisms 4, 5 further has two reflecting surfaces 14 which are inclined to one another and to the respective base surface 13. The two reflecting surfaces 14 of each Porroprism 4, 5 taken together resemble a roof.

The base surfaces 13 of the Porroprisms 4, 5 constitute entry and exit surfaces for light travelling to and from the Porroprisms 4, 5.

The lens units 21–23 and 31–33 are circular and the lens groups 2, 3 have convex external peripheral surfaces. Moreover, the lens units 21–23 and 31–33 are of relatively small diameter. These structural features, in combination with the structure of the Porroprisms 4, 5, make it possible to position the lens groups 2, 3 very close to the respective base surfaces 13 of the Porroprisms 4, 5. Furthermore, the lens group 2 can be placed close to the adjoining inclined surface 14 of the Porroprism 5 while the lens group 3 can be placed close to the adjoining inclined surface 14 of the Porroprism 4. The resulting compact construction is clearly visible in FIG. 2.

In a direction from the lens group 2 to the rhomboidal prism 6, the Porroprisms 4, 5 cause a shift in the optical axis from A to A'. The rhomboidal prism 6 then functions to displace the optical axis from A' back to A. Such a design makes it possible to interchange the objective 1 with another objective which does not rotate images. This is particularly advantageous when the objective 1 is to be used in a photographic copier. An arrangement for interchanging objectives in a photographic copier is disclosed, for example, in the European patent application 0 157 325. The objective 1 is also well-suited for incorporation in a group of objectives which are arranged on a common carrier per the teachings of the German publication 42 24 740. A common carrier of this type can be mounted on an objective platform of a photographic roller copier.

Figure 3:
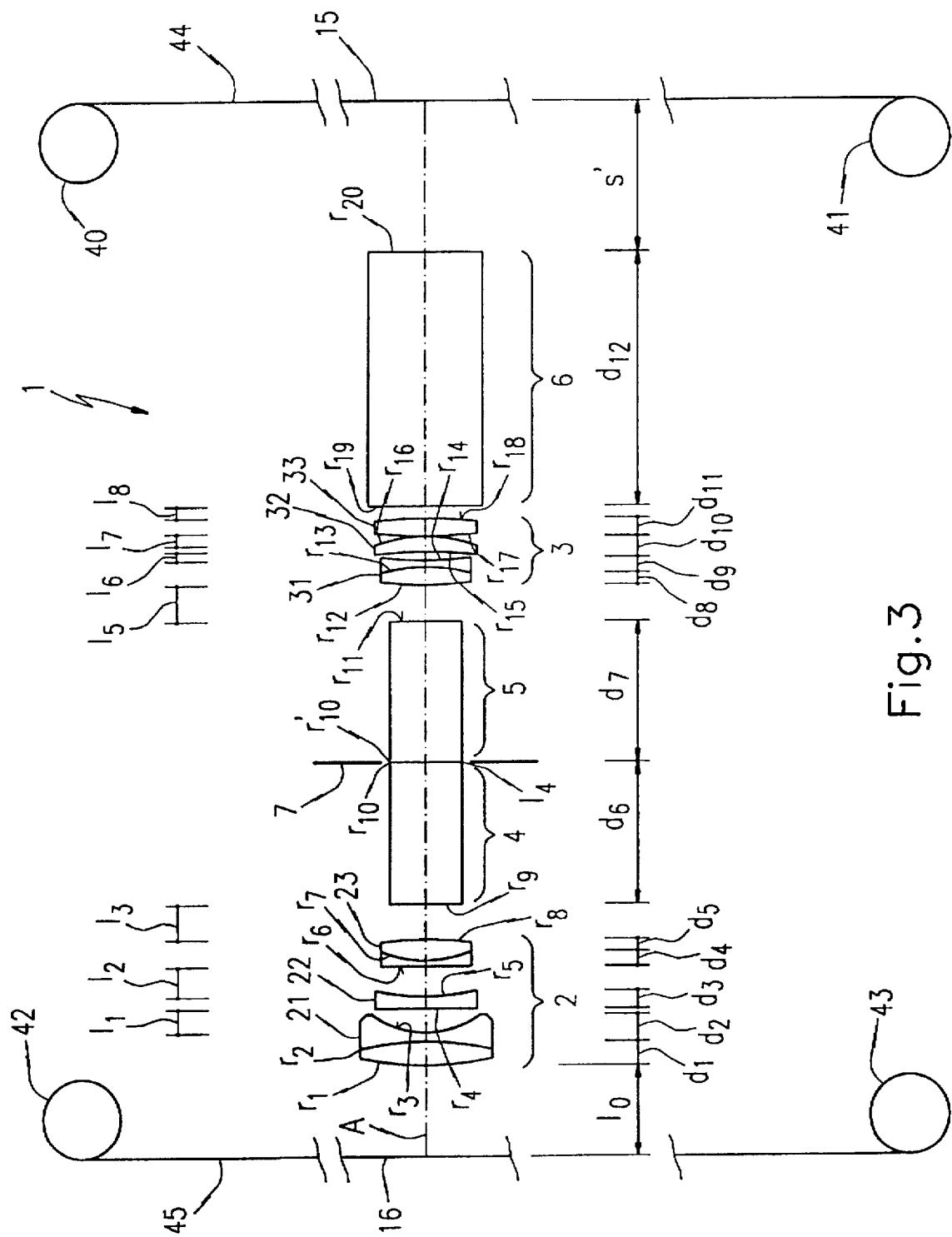
FIG. 3 shows a copier containing the lens system.

FIG. 3 schematically shows the objective 1 in a photographic roll copier. The copier includes a supply reel 40 which accommodates a strip 44 containing a series of coherent masters, e.g., a filmstrip containing a series of frames or negatives. The copier further includes a take-up reel 41 for the strip 44. The reels 40,41 constitute part of a means for transporting the strip 44 along a predetermined path and for positioning different ones of the masters on the strip 44 adjacent to and in register with a flat support 15 defining an object plane. The strip 44, which is mounted on the supply reel 40 in the form of a roll, is unwound from the supply reel 40 so that the various masters on the strip 44 are positioned adjacent the support 15 in turn. As the strip 44 is unwound from the supply reel 40, it is wound onto the take-up reel 44.

The copier is also provided with a supply reel 42 for a band of copy material 45, e.g., photographic paper, which is held on the supply reel 42 in the form of a roll. A take-up reel 43 for the copy material 45 is likewise present in the copier. The reels 42,43 constitute part of a means for advancing the copy material 45 along a predetermined path and for positioning unexposed segments of the copy material 45 adjacent to and in register with a flat support 16 defining an image plane. The copy material 45 is unwound from the supply reel 42 in order to position successive unexposed segments of the copy material 45 adjacent the support 16. The copy material 45 is exposed at the support 16, and the exposed segments of the copy material 45 are wound onto the take-up reel 43.

The objective 1 is arranged between the object plane defined by the support 15 and the image plane defined by the support 16. The objective 1 functions to project images of the masters on the strip 44 onto the copy material 45, and the orientation of the objective 1 is such that the objective 1 serves as an enlarger or magnifier for the masters.

In the illustrated embodiment, the distance between the supports 15,16 is 675 mm and the magnification beta prime is −9.18. With this magnification, 8"×12" prints or copies can be produced from small format masters having a size of 24 mm×36 mm.

The masters on the strip 44 can have various orientations. The objective 1 allows the images formed in the image plane of the support 16 to be rotated relative to the masters. By employing two interchangeable objectives, images can be projected onto the image plane in two different orientations. The copy material 45 can then readily be used for various formats.

TABLE 1 sets forth exemplary characteristics of the objective 1.

TABLE 1

| Magnification | $\beta' = -\frac{1}{9.18}$ |
|---|---|
| Projection Length | 675 mm |
| Image Angle (Field Angle) | 2w = 40 degrees |
| Vignetting-Free Operating Aperture | k = 8 |
| Focal Length | f = 56.9 mm |
| Mechanical Lens-To-Image Distance | greater than 60 mm |

In the description which follows with reference to FIG. 3, the terms "left", "right", "in front of", "behind", etc., are used for ease of explanation and not by way of limitation. The optical axis A' is assumed to be projected onto the optical axis A in FIG. 3 so that the shift in the optical axis A induced by the prisms 4, 5 is not visible.

Beginning from the support 16 in FIG. 3 and proceeding to the right, the first component of the objective 1 is the lens group 2. The lens group 2, which is spaced from the support 16 by a gap of width lo, is a diverging lens group constructed as an inverted Galilean telescope.

The three lens units 21, 22, 23 of the lens group 2 are arranged in that order from left to right. The lens units 21, 22, which are separated from each other by a very small gap of width 11, are diverging lens units while the lens unit 23 is a converging lens unit. The lens unit 23 is spaced from the neighboring lens unit 22 by a gap of width 12.

The lens unit 21 is made up of a left lens and a right lens. The left lens includes a left face which confronts the support 16 and has a radius r1. The right face of the left lens is adhesively bonded to the left face of the right lens, and the bonded faces have a radius r2. The right face of the right lens confronts the lens unit 22 and has a radius r3. The left lens has a thickness d1 while the right lens has a thickness d2.

The lens unit 22 of the lens group 2 is constituted by a single lens having a left face which confronts the lens unit 21 and a right face which confronts the lens unit 23. The left and right faces are of radii r4 and r5, respectively, and the lens constituting the lens unit 22 has a thickness d3.

The lens unit 23 is again made up of a left lens and a right lens. The left face of the left lens, which confronts the lens unit 22, has a radius r6. The right face of the left lens is adhesively bonded to the left face of the right lens, and the bonded faces have a radius r7. The right face of the right lens is of radius r8. The left lens has a thickness d4 whereas the right lens has a thickness d5.

The Porroprism unit 4, 5, which is made up of the Porroprisms 4 and 5, follows the lens group 2 and is spaced from the latter by a gap of width 13. The Porroprism 4 is located to the left of the Porroprism 5 and has a left surface portion of radius r9 which confronts the lens unit 23 of the lens group 2. The Porroprism 4 further has a right surface portion of radiul r10 which confronts a left surface portion of the Porroprism 5. The left surface portion of the Porroprism 5 is of radius r10'. The Porroprism 5 further has a right surface portion with a radius r11.

The confronting right surface portion of the Porroprism 4 and left surface portion of the Porroprism 5 can be adhesively bonded to one another or can be separated from each other by a gap. The distance between these surface portions is denoted by 14, and 14=0 when the surface portions are adhesively bonded to one another.

The Porroprism 4 defines an optical path of length d6 while the Porroprism 5 defines an optical path of length d7. The placement of the stop 7 directly between the Porroprisms 4,5 is readily visible in FIG. 3.

The Porroprisms 4, 5, which are situated at an angle alpha with respect to one another, cause rotation of an image. Moreover, the arrangement of the Porroprisms 4, 5 is such that, similarly to binoculars, the optical axis is shifted laterally.

The lens group 3 follows the Porroprism unit 4, 5. Inasmuch as the Porroprism unit 4,5 effects a lateral shift of the optical axis, the optical axis A' of the lens group 3 located behind the Porroprism unit 4,5 is laterally displaced from the optical axis A of the lens group 2 disposed in front of the Porroprism unit 4, 5.

The right surface portion of the Porroprism 5, i.e., the surface portion of radius r11, confronts the lens group 3. The lens group 3, which is a converging lens group, is spaced from the Porroprism unit 4,5 by a gap of width 15.

The lens units 31, 32, 33 of the lens group 3 are arranged in that order from left to right. The lens unit 31 is a diverging lens unit made up of a left lens and a right lens. The left lens has a left face of radius r12 which confronts the Porroprism unit 4, 5. The right face of the left lens is adhesively bonded to the left face of the right lens, and the bonded faces have a radius r13. The right lens has a right face of radius r14 confronting the lens unit 32. The left lens has a thickness d8 whereas the right lens has a thickness d9.

The lens unit 32 is a converging lens unit consisting of a single lens, and a gap of width 16 exists between the lens unit 32 and the neighboring lens unit 31. The lens unit 32 has a left face which confronts the lens unit 31 and a right face which confronts the lens unit 33. The radii of the left and right faces are r15 and r16, respectively, and the lens constituting the lens unit 32 has a thickness d10.

The lens unit 33 is again a converging lens unit made up of a single lens. A gap of width 17 is present between the lens units 32 and 33. The lens unit 33 has a left face which confronts the lens unit 32 and a right face which is directed away from the lens unit 32. The left and right faces have respective radii r17 and r18, and the lens making up the lens unit 33 has a thickness d11.

The rhomboidal prism 6 is disposed behind the lens group 3 and is separated from the latter by a gap of width 18. The rhomboidal prism 6 has a left surface portion of radius r19 which confronts the lens unit 33 of the lens group 3, and a right surface portion of radius r20 which confronts the support 15. The rhomboidal prism 6 defines an optical path of length d12 and is spaced from the support 15 by a distance s'.

The rhomboidal prism 6 serves to rectify the displacement of the optical axis caused by the Porroprism unit 4, 5 so that light which has been shifted from the optical axis A to the optical axis A' in the Porroprism unit 4,5 is returned to the optical axis A. The length d12 of the optical path defined by the rhomboidal prism 6 is not critical but should be adjusted to the angle alpha between the Porroprisms 4, 5 and the length of the optical path defined by the Porroprisms 4, 5.

TABLE 2 lists exemplary values for the radii r1–r20, the distances lo–18 and s', and the lens thicknesses and optical path lengths d1–d12. Also included in TABLE 2 are exemplary refractive indices and Abbe coefficients for the various lenses.

TABLE 2

| REFERENCE NUMERAL | RADIUS, mm | LENS THICKNESS OR GAP WIDTH, mm | INDEX OF REFRACTION | ABBE COEFFICIENT |
|---|---|---|---|---|
| | | $l_0 = 484.3$ | | |
| 21 | $r_1 = +80.08$ | | | |
| 21 (LENS 1) | | $d_1 = 7.0$ | 1.6940 | 54.5 |
| 21 | $r_2 = -116.55$ | | | |
| 21 (LENS 2) | | $d_2 = 3.1$ | 1.5421 | 59.4 |
| 21 | $r_3 = +29.314$ | | | |
| | | $l_1 = 6.7$ | | |
| 22 | $r_4 = $ INFINITY | | | |
| 22 | | $d_3 = 2.7$ | 1.5749 | 57.2 |
| 22 | $r_5 = +59.47$ | | | |
| | | $l_2 = 13.3$ | | |
| 23 | $r_6 = +1112.0$ | | | |
| 23 (LENS 1) | | $d_4 = 2.2$ | 1.5749 | 57.2 |
| 23 | $r_7 = +40.00$ | | | |
| 23 (LENS 2) | | $d_5 = 5.5$ | 1.6167 | 44.1 |
| 23 | $r_8 = -112.14$ | | | |
| | | $l_3 = 11.0$ | | |
| 4 | $r_9 = $ INFINITY | | | |
| 4 | | $d_6 = 44.0$ | 1.7343 | 28.1 |
| 4 | $r_{10} = $ INFINITY | | | |
| 7 | | $l_4 = 0$ | | |
| 5 | $r_{10} = $ INFINITY | | | |
| 5 | | $d_7 = 44.0$ | 1.7343 | 28.1 |
| 5 | $r_{11} = $ INFINITY | | | |
| | | $l_5 = 11.0$ | | |
| 31 | $r_{12} = +84.58$ | | | |
| 31 (LENS 1) | | $d_8 = 5.5$ | 1.4879 | 84.1 |
| 31 | $r_{13} = -59.47$ | | | |
| 31 (LENS 2) | | $d_9 = 2.7$ | 1.6167 | 44.1 |
| 31 | $r_{14} = +88.76$ | | | |
| 31 | | $l_6 = 2.5$ | | |
| 32 | $r_{15} = -264.0$ | | | |
| 32 | | $d_{10} = 4.5$ | 1.5749 | 57.2 |
| 32 | $r_{16} = -59.47$ | | | |
| | | $l_7 = 0.5$ | | |
| 33 | $r_{17} = +112.89$ | | | |
| 33 | | $d_{11} = 5.5$ | 1.4879 | 84.1 |
| 33 | $r_{18} = -112.89$ | | | |
| | | $l_8 = 4.0$ | | |
| 6 | $r_{19} = $ INFINITY | | | |
| 6 | | $d_{12} = 78.65$ | 1.6241 | 36.1 |
| 6 | $r_{20} = $ INFINITY | | | |
| | | $s' = 64.7$ | | |

The objective 1 constitutes a diffraction limited lens system of high magnification with an extremely large image angle of 40 degrees. Although it has previously been found that maintenance of the limiting angle for total reflection requires an objective to be of relatively large size, the objective 1 can be very compact. In order to use a Porroprism system for total reflection, the angle of the main beam (based on air) as a function of the refractive index of a prism should not be too large. Even for a prism of high refractive index, such angle should not be greater than about 15 degrees.

The length of the objective 1 need be only 200 mm when the width of the objective 1 is 60 mm. The distortion (geometric error of the image) is less than 1 percent. The distance or thickness between the lens groups 2, 3 preferably exceeds 1.2 times the total focal length of the objective 1. This is the distance as measured, for example, by moving away from the lens group 2 along the optical axis A to a first location between the lens groups 2 and 3, moving from such location along a straight line to a second location on the optical axis A', and moving from the second location to the lens group 3 along the optical axis A'. By selecting Porroprisms 4, 5 of high refractive index, the length of the optical path within the Porroprisms 4, 5 can be made 1.5 times the total focal length of the objective 1 and the Porroprisms 4, 5 can accordingly be small. Projection of a large field angle of 2w=40 degrees is possible without vignetting when the stop 7 is centrally positioned between the Porroprisms 4, 5 and the relative opening or aperture size is approximately 1:8. The optical path within the rhomboidal prism 6 advantageously has a length about 1.4 times the total focal length of the objective 1. Even with this long optical path, the free lens-to-image distance can exceed the focal length.

While an exemplary embodiment has been described with reference to the drawings, many variations will occur to one skilled in the art. By changing the geometric or optical characteristics of the lens groups 2, 3, many classes of objectives can be produced. A common feature of all such objectives, however, is that a very compact structure can be achieved.

Various modifications are possible within the meaning and range of equivalence of the appended claims.

We claim:

1. A lens system, comprising first lens means; second lens means; and prism means between said first lens means and said second lens means, said first lens means having negative refractive power and said second lens means having positive refractive power, wherein said first lens means, said second lens means and said prism means together have a predetermined focal length, said first lens means having a first optical axis, and said second lens means having a second optical axis, said first lens means and said second lens means being arranged so that a path extending along said first optical axis from said first lens means to a first location between said first lens means and said second lens means, from said first location substantially linearly to a second location between said first lens means and said second lens means, and from said second location along said second optical axis to said second lens means has a length at least 1.2 times said predetermined focal length.

2. The system of claim 1, wherein said prism means comprises a pair of prisms.

3. The system of claim 2, wherein said prisms are rotationally offset relative to one another.

4. The system of claim 1, wherein said prism means comprises a Porroprism.

5. The system of claim 1, further comprising a stop; and wherein said stop is located at said prism means.

6. The system of claim 1, wherein said prism means is designed to rotate images.

7. The system of claim 1, further comprising a rhomboidal prism.

8. The system of claim 7, wherein said rhomboidal prism is located to a side of said second lens means remote from said prism means.

9. The system of claim 1, wherein said first lens means is designed as an inverted Galilean telescope.

10. The system of claim 1, wherein said prism means comprises a first prism and a second prism each having a pair of surfaces which are inclined to one another, at least part of said first lens means being adjacent one of said surfaces of said first prism, and at least part of said second lens means being adjacent one of said surfaces of said second prism.

11. The system of claim 1, wherein said first lens means has an optical axis; and further comprising a rhomboidal prism to a side of said second lens means remote from said prism means, said rhomboidal prism having a surface through which light leaves or enters said rhomboidal prism, and said optical axis intersecting said surface.

12. The system of claim 11, wherein at least part of said prism means and at least part of said rhomboidal prism face one another.

13. The system of claim 1, wherein said first lens means comprises two diverging lens units and a converging lens unit.

14. The system of claim 1, wherein said second lens means comprises a diverging lens unit and two converging lens units.

15. The system of claim 1, wherein said prism means comprises a pair of prisms; and further comprising a stop between said prisms.

16. The system of claim 1, wherein said first lens means has a first thickness and said second lens means has a second thickness smaller than said first thickness.

17. The system of claim 1, further comprising a rhomboidal prism to a side of said second lens means remote from said prism means, said first lens means having a first optical axis and including:
   (a) a first lens having a first face and a second face,
   (b) a second lens having a first face substantially complementary to said second face of said first lens and also having a second face,
   (c) a third lens spaced from said second lens by a first gap and having a first face confronting said second lens and also having a second face,
   (d) a fourth lens spaced from said third lens by a second gap and having a first face confronting said third lens and also having a second face, and
   (e) a fifth lens having a first face substantially complementary to said second face of said fourth lens and also having a second face,
said prism means including:
   (a) a first prism spaced from said fifth lens by a third gap and having a first surface portion which confronts said fifth lens and also having a second surface portion, and
   (b) a second prism having a first surface portion which confronts said second surface portion of said first prism and also having a second surface portion,
said second lens means having a second optical axis and including:
   (a) a sixth lens spaced from said second prism by a fourth gap and having a first face which confronts said second surface portion of said second prism and also having a second face,
   (b) a seventh lens having a first face substantially complementary to said second face of said sixth lens and also having a second face,
   (c) an eighth lens spaced from said seventh lens by a fifth gap and having a first face confronting said seventh lens and also having a second face, and
   (d) a ninth lens spaced from said eighth lens by a sixth gap and having a first face confronting said eighth lens and also having a second face, said rhomboidal prism being spaced from said ninth lens by a seventh gap and having a first surface portion which confronts said second face of said ninth lens and a second surface portion for the entry of light into and the exit of light from said rhomboidal prism, said lenses and prisms having the following parameters:

| RADIUS, mm | LENS THICKNESS OR GAP WIDTH, mm | INDEX OF REFRACTION | ABBE COEFFICIENT |
|---|---|---|---|
| $r_1 = +80.08$ | | | |
| | $d_1 = 7.0$ | 1.6940 | 54.5 |
| $r_2 = -116.55$ | | | |
| | $d_2 = 3.1$ | 1.5421 | 59.4 |
| $r_3 = +29.314$ | | | |
| | $l_1 = 6.7$ | | |
| $r_4 = $ INFINITY | | | |
| | $d_3 = 2.7$ | 1.5749 | 57.2 |
| $r_5 = +59.47$ | | | |
| | $l_2 = 13.3$ | | |
| $r_6 = +1112.0$ | | | |
| | $d_4 = 2.2$ | 1.5749 | 57.2 |
| $r_7 = +40.00$ | | | |
| | $d_5 = 5.5$ | 1.6167 | 44.1 |
| $r_8 = -112.14$ | | | |
| | $l_3 = 11.0$ | | |
| $r_9 = $ INFINITY | | | |
| | $d_6 = 44.0$ | 1.7343 | 28.1 |
| $r_{10} = $ INFINITY | | | |
| | $l_4 = 0$ | | |
| $r_{10} = $ INFINITY | | | |
| | $d_7 = 44.0$ | 1.7343 | 28.1 |
| $r_{11} = $ INFINITY | | | |
| | $l_5 = 11.0$ | | |
| $r_{12} = +84.58$ | | | |
| | $d_8 = 5.5$ | 1.4879 | 84.1 |
| $r_{13} = -59.47$ | | | |
| | $d_9 = 2.7$ | 1.6167 | 44.1 |
| $r_{14} = +88.76$ | | | |
| | $l_6 = 2.5$ | | |
| $r_{15} = -264.0$ | | | |
| | $d_{10} = 4.5$ | 1.5749 | 57.2 |
| $r_{16} = -59.47$ | | | |
| | $l_7 = 0.5$ | | |
| $r_{17} = +112.89$ | | | |
| | $d_{11} = 5.5$ | 1.4879 | 84.1 |
| $r_{18} = -112.89$ | | | |
| | $l_8 = 4.0$ | | |
| $r_{19} = $ INFINITY | | | |
| | $d_{12} = 78.65$ | 1.6241 | 36.1 |
| $r_{20} = $ INFINITY | | | | where:
r1 is the radius of said first face of said first lens,
r2 is the radius of said second face of said first lens and said first face of said second lens,
r3–r6 are respectively the radii of said second face of said second lens, said first and second faces of said third lens, and said first face of said fourth lens,
r7 is the radius of said second face of said fourth lens and said first face of said fifth lens,
r8–r12 are respectively the radii of said second face of said fifth lens, said first and second surface portions of said first prism, said first and second surface portions of said second prism, and said first face of said sixth lens,
r13 is the radius of said second face of said sixth lens and said first face of said seventh lens,
r14–r20 are respectively the radii of said second face of said seventh lens, said first and second faces of said eighth lens, said first and second faces of said ninth lens, and
said first and second surface portions of said rhomboidal prism, d1–d5 are respectively the thicknesses of said first thru fifth lenses, d6 and d7 are respectively the lengths of the optical paths defined by said first and second prisms, d8–d11 are respectively the thicknesses of said sixth thru ninth lenses, d12 is the length of the optical path defined by said rhomboidal prism, l1–l3 are respectively the widths of said first thru third gaps, l4 is the distance between said second surface portion of said first prism and said first surface portion of said second prism and assumes a value of zero when said second surface portion of said first prism and said first surface portion of said second prism are in abutment, and l5–l8 are respectively the widths of said fourth thru seventh gaps.

18. A copier, comprising a first positioning arrangement for positioning masters at a first location; a second positioning arrangement for positioning copy material at a second location; and a lens system for projecting images of the masters to said second location, said lens system including first lens means, second lens means, and prism means between said first lens means and said second lens means, said first lens means having negative refractive power and said second lens means having positive refractive power, wherein said first lens means, said second lens means and said prism means together have a predetermined focal length, said first lens means having a first optical axis, and said second lens means having a second optical axis, said first lens means and said second lens means being arranged so that a path extending along said first optical axis from said first lens means to a first location between said first lens means and said second lens means, from said first location substantially linearly to a second location between said first lens means and said second lens means, and from said second location along said second optical axis to said second lens means has a length at least 1.2 times said predetermined focal length.

19. The copier of claim 18, wherein said prism means comprises a pair of prisms.

20. The copier of claim 19, wherein said prisms are rotated relative to one another.

21. The copier of claim 18, wherein said prism means comprises a Porroprism.

22. The copier of claim 18, wherein said lens system further includes a stop at said prism means.

23. The copier of claim 18, wherein said prism means is designed to rotate images.

24. The copier of claim 18, wherein said lens system further includes a rhomboidal prism.

25. The copier of claim 24, wherein said rhomboidal prism is located to a side of said second lens means remote from said prism means.

26. The copier of claim 18, wherein said first lens means is designed as an inverted Galilean telescope.

27. The copier of claim 18, wherein said prism means comprises a first prism and a second prism each having a pair of surfaces which are inclined to one another, at least part of said first lens means being adjacent one of said surfaces of said first prism, and at least part of said second lens means being adjacent one of said surfaces of said second prism.

28. The copier of claim 18, wherein said first lens means has an optical axis, said lens system further including a rhomboidal prism to a side of Said second lens means remote from said prism means, and said rhomboidal prism having a surface through which light leaves or enters said rhomboidal prism, said optical axis intersecting said surface.

29. The copier of claim 28, wherein at least part of said prism means and at least part of said rhomboidal prism face one another.

30. The copier of claim 18, wherein said first lens means comprises two diverging lens units and a converging lens unit.

31. The copier of claim 18, wherein said second lens means comprises a diverging lens unit and two converging lens units.

32. The copier of claim 18, wherein said prism means comprises a pair of prisms and said lens means further includes a stop between said prisms.

33. The copier of claim 18, wherein said first lens means has a first thickness and said second lens means has a second thickness smaller than said first thickness.

34. The copier of claim 18, wherein said lens means further comprises a rhomboidal prism to a side of said second lens means remote from said prism means, said first lens means having a first optical axis and including:

(a) a first lens having a first face and a second face, (b) a second lens having a first face substantially complementary to said second face of said first lens and also having a second face, (c) a third lens spaced from said second lens by a first gap and having a first face confronting said second lens and also having a second face, (d) a fourth lens spaced from said third lens by a second gap and having a first face confronting said third lens and also having a second face, and (e) a fifth lens having a first face substantially complementary to said second face of said fourth lens and also having a second face, said prism means including:

(a) a first prism spaced from said fifth lens by a third gap and having a first surface portion which confronts said fifth lens and also having a second surface portion, and (b) a second prism having a first surface portion which confronts said second surface portion of said first prism and also having a second surface portion, said second lens means having a second optical axis and including:

(a) a sixth lens spaced from said second prism by a fourth gap and having a first face which confronts said second surface portion of said second prism and also having a second face, (b) a seventh lens having a first face substantially complementary to said second face of said sixth lens and also having a second face, (c) an eighth lens spaced from said seventh lens by a fifth gap and having a first face confronting said seventh lens and also having a second face, and (d) a ninth lens spaced from said eighth lens by a sixth gap and having a first face confronting said eighth lens and also having a second face, said rhomboidal prism being spaced from said ninth lens by a seventh gap and having a first surface portion which confronts said second face of said ninth lens and a second surface portion for the entry of light into and the exit of light from said rhomboidal prism, said lenses and prisms having the following parameters:

| RADIUS, mm | LENS THICKNESS OR GAP WIDTH, mm | INDEX OF REFRACTION | ABBE COEFFICIENT |
|---|---|---|---|
| $r_1 = +80.08$ | | | |
| | $d_1 = 7.0$ | 1.6940 | 54.5 |
| $r_2 = -116.55$ | | | |
| | $d_2 = 3.1$ | 1.5421 | 59.4 |
| $r_3 = +29.314$ | | | |
| | $l_1 = 6.7$ | | |
| $r_4 = $ INFINITY | | | |
| | $d_3 = 2.7$ | 1.5749 | 57.2 |
| $r_5 = +59.47$ | | | |
| | $l_2 = 13.3$ | | |
| $r_6 = +1112.0$ | | | |
| | $d_4 = 2.2$ | 1.5749 | 57.2 |
| $r_7 = +40.00$ | | | |
| | $d_5 = 5.5$ | 1.6167 | 44.1 |
| $r_8 = -112.14$ | | | |
| | $l_3 = 11.0$ | | |
| $r_9 = $ INFINITY | | | |
| | $d_6 = 44.0$ | 1.7343 | 28.1 |
| $r_{10} = $ INFINITY | | | |
| | $l_4 = 0$ | | |
| $r_{10} = $ INFINITY | | | |
| | $d_7 = 44.0$ | 1.7343 | 28.1 |
| $r_{11} = $ INFINITY | | | |
| | $l_5 = 11.0$ | | |
| $r_{12} = +84.58$ | | | |
| | $d_8 = 5.5$ | 1.4879 | 84.1 |
| $r_{13} = -59.47$ | | | |
| | $d_9 = 2.7$ | 1.6167 | 44.1 |
| $r_{14} = +88.76$ | | | |
| | $l_6 = 2.5$ | | |
| $r_{15} = -264.0$ | | | |
| | $d_{10} = 4.5$ | 1.5749 | 57.2 |
| $r_{16} = -59.47$ | | | |
| | $l_7 = 0.5$ | | |
| $r_{17} = +112.89$ | | | |
| | $d_{11} = 5.5$ | 1.4879 | 84.1 |
| $r_{18} = -112.89$ | | | |
| | $l_8 = 4.0$ | | |
| $r_{19} = $ INFINITY | | | |
| | $d_{12} = 78.65$ | 1.6241 | 36.1 |
| $r_{20} = $ INFINITY | | | | where:

r1 is the radius of said first face of said first lens, r2 is the radius of said second face of said first lens and said first face of said second lens, r3–r6 are respectively the radii of said second face of said second lens, said first and second faces of said third lens, and said first face of said fourth lens, r7 is the radius of said second face of said fourth lens and said first face of said fifth lens, r8–r12 are respectively the radii of said second face of said fifth lens, said first and second surface portions of said first prism, said first and second surface portions of said second prism, and said first face of said sixth lens, r13 is the radius of said second face of said sixth lens and said first face of said seventh lens, r14–r20 are respectively the radii of said second face of said seventh lens, said first and second faces of said eighth lens, said first and second faces of said ninth lens, and said first and second surface portions of said rhomboidal prism.

d1–d5 are respectively the thicknesses of said first thru fifth lenses, d6 and d7 are respectively the lengths of the optical paths defined by said first and second prisms.

d8–d11 are respectively the thicknesses of said sixth thru ninth lenses.

d12 is the length of the optical path defined by said rhomboidal prism.

l1–l3 are respectively the widths of said first thru third gaps.

l4 is the distance between said second surface portion of said first prism and said first surface portion of said second prism and assumes a value of zero when said second surface portion of said first prism and said first surface portion of said second prism are in abutment, and l5–l8 are respectively the widths of said fourth thru seventh gaps.

35. The copier of claim 18, wherein said first positioning arrangement comprises a conveying mechanism for strips of coherent masters, said second positioning arrangement comprising an unwinding and winding mechanism for unwinding copy material from and winding copy material into rolls.

36. A lens system, comprising first lens means; second lens means; and prism means between said first lens means and said second lens means, said first lens means having negative refractive power and said second lens means having positive refractive power, further comprising a rhomboidal prism to a side of said second lens means remote from said prism means, said first lens means having a first optical axis and including:

(a) a first lens having a first face and a second face, (b) a second lens having a first face substantially complementary to said second face of said first lens and also having a second face, (c) a third lens spaced from said second lens by a first gap and having a first face confronting said second lens and also having a second face, (d) a fourth lens spaced from said third lens by a second gap and having a first face confronting said third lens and also having a second face, and (e) a fifth lens having a first face substantially complementary to said second face of said fourth lens and also having a second face, said prism means including:

(a) a first prism spaced from said fifth lens by a third gap and having a first surface portion which confronts said fifth lens and also having a second surface portion, and (b) a second prism having a first surface portion which confronts said second surface portion of said first prism and also having a second surface portion, said second lens means having a second optical axis and including:

(a) a sixth lens spaced from said second prism by a fourth gap and having a first face which confronts said second surface portion of said second prism and also having a second face, (b) a seventh lens having a first face substantially complementary to said second face of said sixth lens and also having a second face, (c) an eighth lens spaced from said seventh lens by a fifth gap and having a first face confronting said seventh lens and also having a second face, and (d) a ninth lens spaced from said eighth lens by a sixth gap and having a first face confronting said eighth lens and also having a second face, said rhomboidal prism being spaced from said ninth lens by a seventh gap and having a first surface portion which confronts said second face of said ninth lens and a second surface portion for the entry of light into and the exit of light from said rhomboidal prism, said lenses and prisms having the following parameters:

| RADIUS, mm | LENS THICKNESS OR GAP WIDTH, mm | INDEX OF REFRACTION | ABBE COEFFICIENT |
|---|---|---|---|
| $r_1 = +80.08$ | | | |
| | $d_1 = 7.0$ | 1.6940 | 54.5 |
| $r_2 = -116.55$ | | | |
| | $d_2 = 3.1$ | 1.5421 | 59.4 |
| $r_3 = +29.314$ | | | |
| | $l_1 = 6.7$ | | |
| $r_4 = $ INFINITY | | | |
| | $d_3 = 2.7$ | 1.5749 | 57.2 |
| $r_5 = +59.47$ | | | |
| | $l_2 = 13.3$ | | |
| $r_6 = +1112.0$ | | | |
| | $d_4 = 2.2$ | 1.5749 | 57.2 |
| $r_7 = +40.00$ | | | |
| | $d_5 = 5.5$ | 1.6167 | 44.1 |
| $r_8 = -112.14$ | | | |
| | $l_3 = 11.0$ | | |
| $r_9 = $ INFINITY | | | |
| | $d_6 = 44.0$ | 1.7343 | 28.1 |
| $r_{10} = $ INFINITY | | | |
| | $l_4 = 0$ | | |
| $r_{10} = $ INFINITY | | | |
| | $d_7 = 44.0$ | 1.7343 | 28.1 |
| $r_{11} = $ INFINITY | | | |
| | $l_5 = 11.0$ | | |
| $r_{12} = +84.58$ | | | |
| | $d_8 = 5.5$ | 1.4879 | 84.1 |
| $r_{13} = -59.47$ | | | |
| | $d_9 = 2.7$ | 1.6167 | 44.1 |
| $r_{14} = +88.76$ | | | |
| | $l_6 = 2.5$ | | |
| $r_{15} = -264.0$ | | | |
| | $d_{10} = 4.5$ | 1.5749 | 57.2 |
| $r_{16} = -59.47$ | | | |
| | $l_7 = 0.5$ | | |
| $r_{17} = +112.89$ | | | |
| | $d_{11} = 5.5$ | 1.4879 | 84.1 |
| $r_{18} = -112.89$ | | | |
| | $l_8 = 4.0$ | | |
| $r_{19} = $ INFINITY | | | |
| | $d_{12} = 78.65$ | 1.6241 | 36.1 |
| $r_{20} = $ INFINITY | | | | where:

r1 is the radius of said first face of said first lens, r2 is the radius of said second face of said first lens and said first face of said second lens, r3–r6 are respectively the radii of said second face of said second lens, said first and second faces of said third lens, and said first face of said fourth lens, r7 is the radius of said second face of said fourth lens and said first face of said fifth lens, r8–r12 are respectively the radii of said second face of said fifth lens, said first and second surface portions of said first prism, said first and second surface portions of said second prism, and said first face of said sixth lens, r13 is the radius of said second face of said sixth lens and said first face of said seventh lens, r14–r20 are respectively the radii of said second face of said seventh lens, said first and second faces of said eighth lens, said first and second faces of said ninth lens, and said first and second surface portions of said rhomboidal prism, d1–d5 are respectively the thicknesses of said first thru fifth lenses, d6 and d7 are respectively the lengths of the optical paths defined by said fast and second prisms, d8–d11 are respectively the thicknesses of said sixth thru ninth lenses, d12 is the length of the optical path defined by said rhomboidal prism, l1–l3 are respectively the widths of said first thru third gaps, l4 is the distance between said second surface portion of said first prism and said first surface portion of said second prism and assumes a value of zero when said second surface portion of said first prism and said first surface portion of said second prism are in abutment, and l5–l8 are respectively the widths of said fourth thru seventh gaps.

37. A copier, comprising a first positioning arrangement for positioning masters at a first location; a second positioning arrangement for positioning copy material at a second location; and a lens system for projecting images of the masters to said second location, said lens system including first lens means, second lens means, and prism means between said first lens means and said second lens means, said first lens means having negative refractive power and said second lens means having positive refractive power, wherein said lens means further comprises a rhomboidal prism to a side of said second lens means remote from said prism means, said first lens means having a first optical axis and including:

(a) a first lens having a first face and a second face, (b) a second lens having a first face substantially complementary to said second face of said first lens and also having a second face, (c) a third lens spaced from said second lens by a first gap and having a first face confronting said second lens and also having a second face, (d) a fourth lens spaced from said third lens by a second gap and having a first face confronting said third lens and also having a second face, and (e) a fifth lens having a first face substantially complementary to said second face of said fourth lens and also having a second face, said prism means including:

(a) a first prism spaced from said fifth lens by a third gap and having a first surface portion which confronts said fifth lens and also having a second surface portion, and b) a second prism having a first surface portion which confronts said second surface portion of said first prism and also having a second surface portion, said second lens means having a second optical axis and including:

(a) a sixth lens spaced from said second prism by a fourth gap and having a first face which confronts said second surface portion of said second prism and also having a second face, (b) a seventh lens having a first face substantially complementary to said second face of said sixth lens and also having a second face, (c) an eighth lens spaced from said seventh lens by a fifth gap and having a first face confronting said seventh lens and also having a second face, and (d) a ninth lens spaced from said eighth lens by a sixth gap and having a first face confronting said eighth lens and also having a second face, said rhomboidal prism being spaced from said ninth lens by a seventh gap and having a first surface portion which confronts said second face of said ninth lens and a second surface portion for the entry of light into and the exit of light from said rhomboidal prism, said lenses and prisms having the following parameters:

| RADIUS, mm | LENS THICKNESS OR GAP WIDTH, mm | INDEX OF REFRACTION | ABBE COEFFICIENT |
|---|---|---|---|
| $r_1 = +80.08$ | | | |
| | $d_1 = 7.0$ | 1.6940 | 54.5 |
| $r_2 = -116.55$ | | | |
| | $d_2 = 3.1$ | 1.5421 | 59.4 |
| $r_3 = +29.314$ | | | |
| | $l_1 = 6.7$ | | |
| $r_4 = $ INFINITY | | | |
| | $d_3 = 2.7$ | 1.5749 | 57.2 |
| $r_5 = +59.47$ | | | |
| | $l_2 = 13.3$ | | |
| $r_6 = +1112.0$ | | | |
| | $d_4 = 2.2$ | 1.5749 | 57.2 |
| $r_7 = +40.00$ | | | |
| | $d_5 = 5.5$ | 1.6167 | 44.1 |
| $r_8 = -112.14$ | | | |
| | $l_3 = 11.0$ | | |
| $r_9 = $ INFINITY | | | |
| | $d_6 = 44.0$ | 1.7343 | 28.1 |
| $r_{10} = $ INFINITY | | | |
| | $l_4 = 0$ | | |
| $r_{10} = $ INFINITY | | | |
| | $d_7 = 44.0$ | 1.7343 | 28.1 |
| $r_{11} = $ INFINITY | | | |
| | $l_5 = 11.0$ | | |
| $r_{12} = +84.58$ | | | |
| | $d_8 = 5.5$ | 1.4879 | 84.1 |
| $r_{13} = -59.47$ | | | |
| | $d_9 = 2.7$ | 1.6167 | 44.1 |
| $r_{14} = +88.76$ | | | |
| | $l_6 = 2.5$ | | |
| $r_{15} = -264.0$ | | | |
| | $d_{10} = 4.5$ | 1.5749 | 57.2 |
| $r_{16} = -59.47$ | | | |
| | $l_7 = 0.5$ | | |
| $r_{17} = +112.89$ | | | |
| | $d_{11} = 5.5$ | 1.4879 | 84.1 |
| $r_{18} = -112.89$ | | | |
| | $l_8 = 4.0$ | | |
| $r_{19} = $ INFINITY | | | |
| | $d_{12} = 78.65$ | 1.6241 | 36.1 |
| $r_{20} = $ INFINITY | | | | where:

r1 is the radius of said first face of said first lens, r2 is the radius of said second face of said first lens and said first face of said second lens, r3–r6 are respectively the radii of said second face of said second lens, said first and second faces of said third lens, and said first face of said fourth lens, r7 is the radius of said second face of said fourth lens and said first face of said fifth lens, r8–r12 are respectively the radii of said second face of said fifth lens, said first and second surface portions of said first prism, said first and second surface portions of said second prism, and said first face of said sixth lens, r13 is the radius of said second face of said sixth lens and said first face of said seventh lens, r14–r20 are respectively the radii of said second face of said seventh lens, said first and second faces of said eighth lens, said first and second faces of said ninth lens, and said first and second surface portions of said rhomboidal prism, d1–d5 are respectively the thicknesses of said first thru fifth lenses, d6 and d7 are respectively the lengths of the optical paths defined by said first and second prisms, d8–d11 are respectively the thicknesses of said sixth thru ninth lenses, d12 is the length of the optical path defined by said rhomboidal prism, l1–l3 are respectively the widths of said first thru third gaps, l4 is the distance between said second surface portion of said first prism and said first surface portion of said second prism and assumes a value of zero when said second surface portion of said first prism and said first surface portion of said second prism are in abutment, and l5–l8 are respectively the widths of said fourth thru seventh gaps.

\* \* \* \* \*